(12) United States Patent
Fujioka

(10) Patent No.: US 11,001,756 B2
(45) Date of Patent: *May 11, 2021

(54) METHOD OF PRODUCING HYBRID FLUORESCENT MATERIAL

(71) Applicant: NICHIA CORPORATION, Anan (JP)

(72) Inventor: Naoto Fujioka, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/549,298

(22) Filed: Aug. 23, 2019

(65) Prior Publication Data

US 2019/0375985 A1 Dec. 12, 2019

Related U.S. Application Data

(63) Continuation of application No. 15/371,957, filed on Dec. 7, 2016, now Pat. No. 10,428,270.

(30) Foreign Application Priority Data

Dec. 9, 2015 (JP) ................................. 2015-240110

(51) Int. Cl.
*C09K 11/77* (2006.01)
*B05D 1/18* (2006.01)

(52) U.S. Cl.
CPC ............ *C09K 11/7774* (2013.01); *B05D 1/18* (2013.01)

(58) Field of Classification Search
CPC ................................................. C09K 11/7774
See application file for complete search history.

(56) References Cited

U.S. PATENT DOCUMENTS 7,019,284 B2 * 3/2006 Srivastava ......... G01N 33/2823
250/256
7,521,862 B2 * 4/2009 Mueller ............. C09K 11/7774
313/506

(Continued)

FOREIGN PATENT DOCUMENTS

JP  S52043789 A   4/1977
JP  2004067860 A  3/2004

(Continued)

*Primary Examiner* — C Melissa Koslow
(74) *Attorney, Agent, or Firm* — Hunton Andrews Kurth LLP

(57) ABSTRACT

A method of producing hybrid fluorescent material includes dispersing $Lu_3Al_5O_{12}$:Ce fluorescent material particles in a first solution; mixing the first solution in a second solution, the second solution including a mixture of a first metallic salt containing at least one element selected from the group consisting of yttrium, gadolinium, and terbium, a second metallic salt containing aluminum and/or gallium, and a third metallic salt containing cerium, wherein the mixing attaches $(Y,Gd,Tb)_3(Al,Ga)_5O_{12}$:Ce fluorescent material precursor particles on surfaces of the $Lu_3Al_5O_{12}$:Ce fluorescent material particles to obtain a hybrid fluorescent material precursor; separating the hybrid fluorescent material precursor particles from the first and second solutions; and calcining the hybrid fluorescent material precursor particles to obtain a hybrid fluorescent material of $Lu_3Al_5O_{12}$:Ce fluorescent material particles covered by $(Y,Gd,Tb)_3(Al,Ga)_5O_{12}$:Ce fluorescent material.

10 Claims, 4 Drawing Sheets

(56) References Cited

U.S. PATENT DOCUMENTS

| | | | |
|---|---|---|---|
| 8,088,304 | B2 | 1/2012 | Winkler et al. |
| 8,519,609 | B2 | 8/2013 | Winkler et al. |
| 8,946,982 | B2 | 2/2015 | Winkler et al. |
| 10,428,270 | B2 * | 10/2019 | Fujioka .............. C09K 11/7774 |
| 2006/0222757 | A1 | 10/2006 | Loureiro et al. |
| 2013/0250544 | A1 | 9/2013 | Zink et al. |

FOREIGN PATENT DOCUMENTS

| | | |
|---|---|---|
| JP | 2006-282996 A | 10/2006 |
| JP | 2011-503266 A | 1/2011 |
| JP | 2012-505266 A | 3/2012 |
| JP | 2013129784 A | 7/2013 |
| JP | 5313173 B2 | 10/2013 |
| JP | 2015183084 A | 10/2015 |

* cited by examiner

METHOD OF PRODUCING HYBRID FLUORESCENT MATERIAL

CROSS-REFERENCE TO RELATED PATENT APPLICATION

This is a continuation application of U.S. patent application Ser. No. 15/371,957, filed Dec. 7, 2016, which claims the benefit of Japanese Patent Application No. 2015-240110, filed on Dec. 9, 2015, the disclosure of all which is hereby incorporated by reference in their entirety.

BACKGROUND

Technical Field

The present disclosure relates to a hybrid fluorescent material and a method of producing the same.

Description of Related Art

Light emitting diodes (LEDs) are semiconductor light emitting elements produced from a metal compound such as gallium nitride (GaN). Various light emitting devices to emit light of a white color, an incandescent lamp color, an orange color and so on have been developed by combining a semiconductor light emitting element and a phosphor. For example, light emitting devices that employ a blue-light emitting element and a phosphor to emit yellow light are in demand in a wide range of fields such as general lighting, on-vehicle lighting, displays, backlights for liquid crystal devices.

For example, for a fluorescent material that is excited by blue light emitted from a light emitting element and emits yellow light, an yttrium aluminum garnet (YAG) fluorescent material having a garnet structure $Y_3Al_5O_{12}$:Ce has been used. A YAG fluorescent material may be provided in particles; for example, the published Japanese translations of PCT Patent App. Pub. No. 2011-503266 describes YAG fluorescent material particles obtained by using a wet chemical method and subsequent multi-step calcination, and PCT Patent App. Pub. No. 2012-505266 describes coated by metal, transition-metal, or semimetal oxide. Meanwhile, an example of a fluorescent material having a garnet structure, Japanese Patent Publication No. 5313173 describes a fluorescent material having coating of particles of $SiO_2$, $TiO_2$, $Al_2O_3$, ZnO, $ZrO_2$, and/or $Y_2O_3$ etc., or coating of oxides of those.

SUMMARY

The luminance of YAG fluorescent materials decreases with a rise in temperature of the YAG fluorescent materials which exhibits a large temperature quenching of the luminance of YAG fluorescent materials and requires an improvement in the temperature characteristics of the YAG fluorescent materials. Accordingly, an aim of the present disclosure is to provide a hybrid fluorescent material configured to maintain a target color of light and to reduce the luminance decrease associated with the rise in temperature and a method of producing the same.

Specific examples for achieving the objects will be described below, and the present disclosure includes the following exemplary embodiments.

According to a first embodiment of the present disclosure, a method of producing a hybrid fluorescent material includes the steps of:

dispersing $Lu_3Al_5O_{12}$:Ce (hereinafter may be referred to as "LuAG:Ce") fluorescent material particles in a first solution;

mixing the first solution in a second solution, the second solution including a mixture of a first metallic salt containing at least one element selected from the group consisting of yttrium, gadolinium, and terbium, a second metallic salt containing aluminum and/or gallium, and a third metallic salt containing cerium, wherein the mixing attaches (Y, Gd, Tb)$_3$(Al, Ga)$_5$O$_{12}$:Ce (hereinafter may be referred to as "YAG:Ce-based") fluorescent material precursor particles on surfaces of the $Lu_3Al_5O_{12}$:Ce fluorescent material particles to obtain a hybrid fluorescent material precursor;

separating the hybrid fluorescent material precursor from the first and second solutions; and calcining the hybrid fluorescent material precursor to obtain a hybrid fluorescent material of $Lu_3Al_5O_{12}$:Ce fluorescent material particles covered by a (Y, Gd, Tb)$_3$(Al, Ga)$_5$O$_{12}$:Ce fluorescent material.

According to a second embodiment of the present disclosure, a hybrid fluorescent material includes $Lu_3Al_5O_{12}$:Ce fluorescent material particles covered by (Y, Gd)$_3$(Al, Ga)$_5$O$_{12}$:Ce (hereinafter may be referred to as "YAG:Ce") fluorescent material, wherein the hybrid fluorescent material emits light of color corresponding to the CIE color coordinates of x value in a range of 0.370 to 0.400 and y value in a range of 0.550 to 0.580 upon excitation by light of a wavelength 490 nm or less.

According to a third embodiment of the present disclosure, a hybrid fluorescent material includes $Lu_3Al_5O_{12}$:Ce fluorescent material particles covered by $Tb_3Al_5O_{12}$:Ce (hereinafter may be referred to as "TAG:Ce") fluorescent material, wherein the hybrid fluorescent material emits light of color corresponding to the CIE color coordinates of x value in a range of 0.400 to 0.470 and y value in a range of 0.510 to 0.550 upon excitation by light of a wavelength 490 nm or less.

Embodiment of the present disclosure provide a hybrid fluorescent material which can emit and maintain a desired color of light with improved temperature characteristics, and a method of producing the same.

DETAILED DESCRIPTION

Figure 1A:
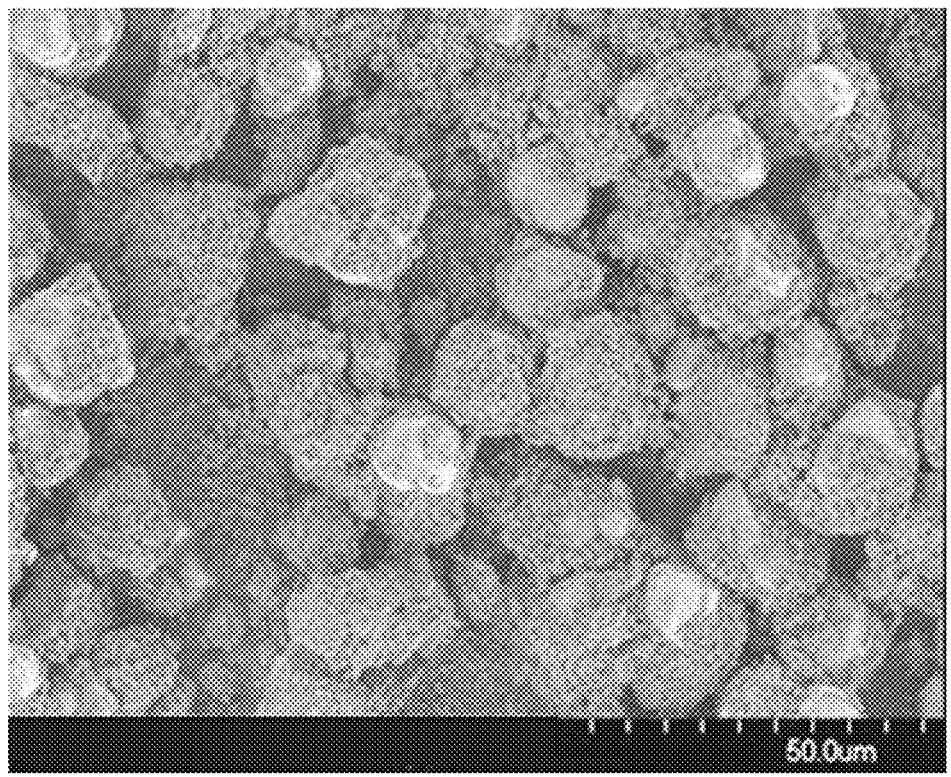
FIG. 1A is an SEM image showing hybrid fluorescent material precursor particles in which YAG:Ce-based fluorescent material particles are attached on LuAG:Ce fluorescent material particles.

A method of producing a hybrid fluorescent material and the hybrid fluorescent material according to certain embodiments of the present invention will be described below. The preferred embodiments are intended as illustrative of light emitting devices to give concrete forms to technical ideas of the present invention, and the scope of the invention is not limited to those described below. The relation between the color names and the chromaticity coordinates, the relation between the range of wavelength of light and the color name of single color light, and the like conform to JIS 8110.

Method of Producing Hybrid Fluorescent Material

A method of producing a hybrid fluorescent material according to a first embodiment of the present disclosure includes the following steps:

dispersing $Lu_3Al_5O_{12}$:Ce fluorescent material particles in a first solution; mixing the first solution in a second solution, the second solution including a mixture of a first metallic salt containing at least one element selected from the group consisting of yttrium, gadolinium, and terbium, a second metallic salt containing aluminum and/or gallium, and a third metallic salt containing cerium, wherein the mixing attaches $(Y, Gd, Tb)_3(Al, Ga)_5O_{12}$:Ce fluorescent material precursor particles on surfaces of the $Lu_3Al_5O_{12}$:Ce fluorescent material particles to obtain a hybrid fluorescent material precursor;

separating the hybrid fluorescent material precursor from the first and second solutions; and calcining the hybrid fluorescent material precursor to obtain a hybrid fluorescent material of $Lu_3Al_5O_{12}$:Ce fluorescent material particles covered by a $(Y, Gd, Tb)_3(Al, Ga)_5O_{12}$:Ce fluorescent material.

The following paragraphs provide additional description of the method.

Providing $Lu_3Al_5O_{12}$:Ce Fluorescent Material Particles $Lu_3Al_5O_{12}$:Ce fluorescent material particles are provided. LuAG:Ce fluorescent material particles are particles of a lutetium aluminum garnet type fluorescent material represented by $Lu_3Al_5O_{12}$:Ce, which is activated with an appropriate amount of cerium. Particles of LuAG:Ce fluorescent material can have an appropriate average particle diameter, which is preferably in a range of 5 to 25 μm, and more preferably in a range of 7 to 20 μm. In the present specification, the average particle diameter of fluorescent material particles is a volume-average particle diameter, represented by a median diameter measured by using a laser diffraction-type particle-size distribution measuring device (the MASTER SIZER 3000, manufactured by Malvern Instruments Ltd.).

Raw Material Mixture

Oxides or compounds readily convertible to oxides in a high temperature that collectively contain constituent elements of $Lu_3Al_5O_{12}$:Ce are provided as raw materials, and weighed according to the stoichiometric ratio. Alternatively, the compounds containing the constituent elements as described above may be weighed according to the stoichiometric ratio, and dissolved in an acid, then, coprecipitation is performed using oxalic acid to obtain a coprecipitate. The coprecipitate is calcined to obtain an oxide. The oxide and optional other materials, for example, aluminum oxide or gallium oxide are weighed, and wet-mixed or dry-mixed by using a mixing machine described below. Examples of the oxides or compounds readily convertible to oxides in a high temperature that collectively contain lutetium (Lu), aluminum (Al), and cerium (Ce) include oxides, hydroxides, oxalates, carbonates, chlorides, nitrates, and sulphates. Examples of the oxides include lutetium oxide ($Lu_2O_3$), aluminum oxide ($Al_2O_3$), and cerium oxide ($CeO_2$).

A ball mill, a vibration mill, a roll mill, a jet mill, or the like as generally used in the industry may be used to perform the mixing. Pulverizing by using a pulverizing machine provides a powder, so that specific surface area can be increased. In order to obtain a certain range of specific surface area, desired sizes of the powder can be separated by using a wet separating device such as a settling tank, a hydro-cyclone, or a centrifugal separating device, or a dry separating device such as a cyclone separating device, or an air separating device, those commonly used in the industry.

Further, the raw material mixture may include flux. With the addition of flux, solid-phase reaction can be accelerated and particles of substantially uniform size can be formed. The flux may be added when appropriate, and the flux may be preferably added to the raw material mixture after mixing the raw materials to obtain the desired composition. Examples of the flux include alkaline earth halides and boron compounds. Examples of alkaline earth halides include fluorides, chlorides, and bromides. Among those, fluorides are preferable, such as barium fluoride ($BaF_2$), strontium fluoride ($SrF_2$), or the like. Further, among the fluorides, barium fluoride ($BaF_2$) is preferable. Examples of the boron compound include boron oxide ($B_2O_3$) and boric acid ($H_3BO_3$). The flux may be composed of one material or the flux may be composed of a combination of two or more materials.

The raw material mixture is heat treated to obtain a calcined material having a composition of $Lu_3Al_5O_{12}$:Ce. The mixed raw materials is charged in a crucible of, silicon carbide (SiC), quartz, alumina ($Al_2O_3$), boron nitride (BN) or the like, and subjected to calcination in an inert atmosphere such as argon, nitrogen, or in a reduction atmosphere containing hydrogen, or in an oxidizing atmosphere (in the air). For the heat treatment, for example, a gas-pressure electric furnace can be used. The heat treatment temperature is preferably in a range of 1000° C. to 2100° C., more preferably in a range of 1200° C. to 2000° C., further preferably in a range of 1300° C. to 1800° C., further more preferably in a range of 1400° C. to 1600° C. The duration of heat treating differs according to the temperature rising speed, calcining time, calcining atmosphere, and the like, and may preferably be 1 hour or longer, more preferably 2 hours or longer, further preferably 3 hours or longer, and may preferably be 20 hours or less, more preferably 18 hours or less, and further preferably 15 hours or less.

The calcined product is wet-sieved, then, dehydrated and dried, and dry-sieved to obtain $Lu_3Al_5O_{12}$:Ce fluorescent material particles with a desired average particle diameter.

Dispersing $Lu_3Al_5O_{12}$:Ce Fluorescent Material Particles in Solution $Lu_3Al_5O_{12}$:Ce fluorescent material particles are dispersed in a first solution. The first solution preferably contains at least one carbonate selected from the group consisting of sodium carbonate, potassium carbonate, sodium hydrogen carbonate, ammonium hydrogen carbonate, and ammonium carbonate. Of those, ammonium hydrogen carbonate or ammonium carbonate can be preferably employed to create a solution containing ammonium hydrogen carbonate or a solution containing ammonium carbonate. The first solution also contains at least water and may contain a polar solvent which does not react with the materials for the fluorescent material, for example, acetone or alcohol (e.g., ethanol, methanol or the like). Ammonium hydrogen carbonate or ammonium carbonate can be contained in the solution at an appropriate concentration, preferably in a range of 3 to 30 mass %, more preferably 5 to 25 mass %, further preferably 8 to 20 mass %. The volume of the solution to disperse LuAG:Ce fluorescent material particles can be appropriately determined, and preferably, LuAG:Ce fluorescent material particles are dispersed in a solution five to ten times the mass of the LuAG:Ce fluorescent material particles. With the concentration of the ammonium hydrogen carbonate or ammonium carbonate that is used as a precipitant is in the range described above, the fluorescent material particles can be dispersed approximately uniformly in the solution, which allows the fluorescent material covering precursor to attach to approximately the entire surfaces of the fluorescent material particles.

Providing a Solution Containing a Mixture

A second solution containing a mixture is also provided. The mixture is a first metallic salt containing at least one element selected from the group consisting of yttrium, gadolinium, and terbium, a second metallic salt containing aluminum and/or gallium, and a third metallic salt containing cerium. The first metallic salt, the second metallic salt, and the third metallic salt are salts of at least one selected from the group consisting of nitrate, sulphate, and chloride, respectively. Examples of metallic salt containing elemental yttrium (Y) include yttrium nitrate ($Y_2(NO_3)_3$), yttrium sulfate ($Y_2(SO_4)_3$), and yttrium chloride ($YCl_3$). Hydrates of those metallic salts containing elemental yttrium may be employed. Of those, yttrium nitrate ($Y_2(NO_3)_3$) is preferable due to its high solubility to water. Examples of metallic salt containing elemental gadolinium (Gd) include gadolinium nitrate ($Gd(NO_3)_3$), gadolinium sulfate ($Gd_2(SO_4)_3$), and gadolinium chloride ($GdCl_3$). Hydrates of those metallic salts containing elemental gadolinium may be employed. Of those, gadolinium nitrate ($Gd(NO_3)_3$) is preferable due to its high solubility to water. Examples of metallic salt containing elemental terbium (Tb) include terbium nitrate ($Tb(NO_3)_3$), terbium sulfate ($Tb_2(SO_4)_3$), and terbium chloride ($TbCl_3$). Hydrates of those metallic salts containing elemental terbium may be employed. Of those, terbium nitrate ($Tb(NO_3)_3$) that has high solubility to water is preferable. The first metallic salt contains one element selected from the group consisting of yttrium, gadolinium, and terbium, and soluble in water, and in addition to nitrate, sulphate, and chloride, for example, bromate such as gadolinium bromate ($Gd(BrO_3)_3$), terbium bromate ($Tb(BrO_3)_3$) can also be employed. The first metallic salt may be used singly or in combination of two or more kinds so as to obtain the composition of the fluorescent material that covers LuAG:Ce fluorescent material particles.

Examples of metallic salt containing elemental aluminum include aluminum nitrate ($Al(NO_3)_3$), aluminum sulfate ($Al_2(SO_4)_3$), and aluminum chloride ($AlCl_3$). Hydrates of those metallic salts containing elemental aluminum may be employed.

Examples of metallic salt containing elemental gallium include gallium nitrate ($Ga(NO_3)_3$), gallium sulfate ($Ga_2(SO_4)_3$), and gallium chloride ($GaCl_3$). Hydrates of those metallic salts containing elemental gallium may be employed. The second metallic salt may be used singly or in combination of two or more kinds so as to obtain the composition of the fluorescent material that covers LuAG:Ce fluorescent material particles.

Examples of metallic salt containing elemental cerium, that is the third metallic salt include cerium nitrate ($Ce(NO_3)_3$), cerium sulfate ($Ce_2(SO_4)_3$), and cerium chloride ($CeCl_3$). Hydrates of those metallic salts containing elemental cerium may be employed.

In order to make a precursor for a yttrium-aluminum-garnet-type fluorescent material activated with cerium, metallic salts collectively containing constituent elements of a compound represented by a formula $(Y, Gd, Tb)_3(Al, Ga)_5O_{12}$:Ce are provided. The metallic salts are weighed according to the stoichiometric ratio, and dissolved in water to provide a solution containing the metallic salts.

Mixing Solutions to Obtain Hybrid Fluorescent Material Precursor

The second solution is supplied to the first solution, in which the $Lu_3Al_5O_{12}$:Ce fluorescent material particles are dispersed, so that a particulateYAG:Ce-based fluorescent material precursor is attached on the $Lu_3Al_5O_{12}$:Ce fluorescent material particles in order to obtain a hybrid fluorescent material precursor. More specifically, while agitating the first solution in which the $Lu_3Al_5O_{12}$:Ce fluorescent material particles are dispersed, the second solution is added in drop. Then by crystallization, particles of YAG:Ce-based fluorescent material precursor having diameters smaller than that of the LuAG:Ce fluorescent material are attached on the surfaces of the LuAG:Ce fluorescent material, and precipitates are obtained. By employing a wet co-precipitation method that uses a solution containing at least one carbonate as a precipitator; that is, uniformly dispersing LuAG:Ce fluorescent material particles in a solution that contains at least one such precipitator, and supplying a solution containing a first metallic salt, a second metallic salt, and a third metallic salt to the dispersion, the YAG:Ce-based fluorescent material precursor can be attached to substantially the entire surfaces of the LuAG:Ce fluorescent material particles, and thus a hybrid fluorescent material precursor can be made.

The total content of the first metallic salt, the second metallic salt, and the third metallic salt in the solution for forming the YAG:Ce-based fluorescent material precursor may differ according to the form of the metallic salts, but the first metallic salt, the second metallic salt, and the third metallic salt are preferably contained so that 1 to 25 pts. mass of YAG:Ce-based fluorescent material is attached to 100 pts. mass of LuAG:Ce fluorescent material dispersed in the solution in the step (B).

Separating Hybrid Fluorescent Material Precursor from Solution

Next, the hybrid fluorescent material precursor is separated from the solutions. More specifically, precipitate of the hybrid fluorescent material precursor obtained in the previous step is filtered and dried, and sieved to give the hybrid fluorescent material precursor having a desired average particle diameter.

Calcining Hybrid Fluorescent Material Precursor

In the next step, the hybrid fluorescent material precursor is calcined to obtain a hybrid fluorescent material of $Lu_3Al_5O_{12}$:Ce fluorescent material particles whose surfaces are covered by a $(Y,Gd,Tb)_3(Al,Ga)_5O_{12}$:Ce fluorescent material. In the present embodiment, the YAG:Ce-based fluorescent material is a yttrium aluminum garnet type fluorescent material represented by $(Y,Gd,Tb)_3(Al,Ga)_5O_{12}$:Ce, which is activated with an appropriate amount of cerium, and provided in particles.

Calcining preferably includes a step of mixing the hybrid fluorescent material precursor and a flux.

Examples of the flux include oxides and halides, and among halides, fluorides are preferable. Examples of the halides include rare-earth halides, alkaline-earth halides, alkali-metal halides, and ammonium halides, and ammonium halides are preferable. Examples of ammonium halides include ammonium fluoride ($NH_4F$) and ammonium chloride ($NH_4Cl$). Of those, ammonium fluoride ($NH_4F$) is preferable. The addition of the flux can further accelerate the reaction of the fluorescent material precursor attached on the surfaces of the LuAG:Ce fluorescent material particles, which allows a uniform solid-phase reaction, so that the YAG:Ce-based fluorescent material can be formed in a film shape, covering approximately the entire surfaces of the LuAG:Ce fluorescent material particles. The YAG:Ce-based fluorescent material covering the surfaces of the LuAG:Ce fluorescent material particles may be of uniform thickness, or may have uneven thickness. The YAG:Ce-based fluorescent material preferably covers almost whole surfaces of the LuAG:Ce fluorescent material particles, but if a desired color of light can be obtained, portions of LuAG:Ce fluorescent material particles are allowed not to be covered by the YAG:Ce-based fluorescent material.

The hybrid fluorescent material precursor is charged in a crucible of, silicon carbide (SiC), quartz, alumina ($Al_2O_3$), boron nitride (BN) or the like, and subjected to calcination in an inert atmosphere such as argon, nitrogen, or in a reducing atmosphere containing hydrogen, or in an oxidizing atmosphere (in the air). It is preferable that calcination is carried out in a reducing atmosphere. The calcination temperature is preferably between 1000° C. and 2100° C., more preferably between 1200° C. and 2000° C., further preferably between 1300° C. and 1800° C., and further preferably between 1400° C. and 1600° C. The duration of heat treating differs according to the temperature rising speed, calcining time, calcining atmosphere, and the like, and may preferably be 1 hour or longer, more preferably 2 hours or longer, and further preferably 3 hours or longer, and may preferably be 20 hours or less, more preferably 18 hours or less, further preferably 15 hours or less.

Post-Treating

The method of producing a hybrid fluorescent material may include a step of post-treating of wet-dispersing the calcined hybrid fluorescent material, then conducting wet-sieving, dehydrating, drying, and dry-sieving to obtain hybrid fluorescent material of a desired average particle diameter. In this step, the calcined hybrid fluorescent material is dispersed in a non-aqueous organic solvent or in an aqueous solvent. The dispersed calcined product is placed on a sieve and wet-sieving is performed by applying a continuous flow of a solvent while applying various kinds of vibrations, then, dehydration, drying, and dry-sieving are performed to obtain a hybrid fluorescent material of LuAG:Ce fluorescent material particles having a desired average particle diameter, whose surfaces are covered by a YAG:Ce-based fluorescent material. By dispersing the calcined hybrid fluorescent material in the aqueous solvent, impurities such as the residue of flux after calcining and unreacted raw materials can be removed. For the wet-dispersing, media such as alumina balls, zirconia balls, or the like may be used.

In the method of producing a hybrid fluorescent material according to embodiments of the present disclosure, after post-treating step, the obtained hybrid fluorescent material may be dispersed in a solution containing ammonium hydrogen carbonate or in a solution containing ammonium carbonate, and the previous steps of mixing solutions to obtain hybrid fluorescent material precursor, separating the hybrid fluorescent material precursor from the solution, calcining the hybrid fluorescent material prescuro, and post-treating may be repeated to increase the amount of YAG:Ce-based fluorescent material coating that attached to the surfaces of the LuAG:Ce fluorescent material particles to obtain a hybrid fluorescent material that can emit light of desired color.

Hybrid Fluorescent Material

In a second embodiment of the present disclosure, the hybrid fluorescent material is $Lu_3Al_5O_{12}$:Ce fluorescent material particles covered by $(Y,Gd)_3(Al,Ga)_5O_{12}$:Ce fluorescent material. In a third embodiment of the present disclosure, the hybrid fluorescent material is $Lu_3Al_5O_{12}$:Ce fluorescent material particles whose surfaces are covered by $Tb_3Al_5O_{12}$:Ce fluorescent material.

Generally, LuAG:Ce fluorescent materials have better thermal characteristics compared to YAG:Ce fluorescent materials and TAG:Ce fluorescent materials, but LuAG:Ce fluorescent materials may emit light of different color. Accordingly, the hybrid fluorescent materials according to the present disclosure may be designed to emit the color of light emitted by the YAG:Ce fluorescent material or the TAG:Ce fluorescent material, and may employ particles of LuAG:Ce fluorescent material that has good thermal characteristics for the cores which tend to be relatively large in volume, whose surfaces are covered by the YAG:Ce fluorescent material or by the TAG:Ce fluorescent material. With this configuration, the hybrid fluorescent material as a whole has good thermal characteristics due to the LuAG:Ce fluorescent material at inner side. The surface of the LuAG:Ce fluorescent material is covered by the YAG:Ce fluorescent material or the TAG:Ce fluorescent material, so that the color of light emitted from the fluorescent material can be similar to that of the YAG:Ce fluorescent material or the TAG:Ce fluorescent material compared to that of the LuAG:Ce fluorescent material alone. Further, light from the excitation light source also reaches the LuAG:Ce fluorescent material particles and produce emission, thus a constant optical output can be maintained.

The hybrid fluorescent material has an average particle diameter in a range of preferably 5.1 to 35 μm, and more preferably 5.2 to 30 μm. In the present specification, the average particle diameter of fluorescent material particles is a volume-average particle diameter, represented by a median diameter measured by using a laser diffraction-type particle-size distribution measuring device (the MASTER SIZER 3000, manufactured by Malvern Instruments Ltd.).

The content of the YAG:Ce-based fluorescent material in the hybrid fluorescent material can be appropriately determined based on the desired color of light to be emitted by the hybrid fluorescent material, and the content of the YAG:Ce-based fluorescent material in the hybrid fluorescent material is preferably in a range of 1 to 20 mass %, more preferably in a range of 1 to 18 mass %, and further preferably in a range of 1 to 15 mass %. When the content of the YAG:Ce-based fluorescent material in the hybrid fluorescent material is in a range of 1 to 20 mass %, the hybrid fluorescent material that can maintain the desired color of light and has good temperature characteristics can be provided.

The thickness of the YAG:Ce-based fluorescent material that covers the LuAG:Ce fluorescent material particles of the hybrid fluorescent material can be appropriately determined based on the desired color of light to be emitted by the hybrid fluorescent material, and the thickness is preferably in a range of about 0.1% to about 45% of the average diameter of the LuAG:Ce fluorescent material particles. The thickness of the YAG:Ce-based fluorescent material with respect to the average diameter of the LuAG:Ce fluorescent material particles is more preferably in a range of 0.2% to 40%, further preferably in a range of 0.3% to 35%, and further preferably in a range of 0.4% to 30%. That is, the ratio of the thickness of the YAG:Ce-based fluorescent material with respect to the average particle size (diameter)

of the LuAG:Ce fluorescent material particles; that is, the thickness of YAG:Ce-based fluorescent material coating/average particle size of LuAG:Ce fluorescent material particles is preferably in a range of 0.001 to 0.45, more preferably in a range of 0.002 to 0.40, further preferably in a range of 0.003 to 0.35, and further preferably in a range of 0.004 to 0.30. The thickness of the fluorescent material coating of the hybrid fluorescent material can be appropriately determined based on the desired color of light to be emitted by the hybrid fluorescent material, and the YAG:Ce-based fluorescent material does not necessarily have a substantially uniform thickness and may have uneven thickness. For example, the YAG:Ce-based fluorescent material coating that covers the surfaces of the LuAG:Ce fluorescent material particles may have portions with a thickness of about 45% with respect to the average diameter of YAG:Ce fluorescent material particles and have different portions with a thickness of about 0.1% with respect to the average diameter of LuAG:Ce fluorescent material particles. If the hybrid fluorescent material can emit light of desired color, portions of the surfaces of the LuAG:Ce fluorescent material particles may not be covered by the YAG:Ce-based fluorescent material.

The hybrid fluorescent material according to the second embodiment of the present disclosure includes $Lu_3Al_5O_{12}$:Ce fluorescent material particles covered by $(Y,Gd)_3(Al,Ga)_5O_{12}$:Ce fluorescent material, and when it is excited by light of a wavelength of 490 nm or less emitted from an excitation light source, preferably emit light of color corresponding to the CIE color coordinates of x value in a range of 0.370 to 0.400 and y value in a range of 0.550 to 0.580. Also, when the hybrid fluorescent material is excited by light of a wavelength of 490 nm or less emitted from an excitation light source, the hybrid fluorescent material preferably emit light of color corresponding to the CIE color coordinates of x value in a range of 0.375 to 0.395 and y value in a range of 0.555 to 0.575. When the x value and the y value of the hybrid fluorescent material confirm the range of the CIE color coordinates described above, a desired color of light can be obtained.

The hybrid fluorescent material according to the third embodiment of the present disclosure includes $Lu_3Al_5O_{12}$:Ce fluorescent material particles covered by $Tb_3Al_5O_{12}$:Ce fluorescent material, and when it is excited by light of a wavelength of 490 nm or less emitted from an excitation light source, preferably emit light of color corresponding to the CIE color coordinates of x value in a range of 0.400 to 0.470 and y value in a range of 0.510 to 0.550. Also, when the hybrid fluorescent material is excited by light of a wavelength of 490 nm or less emitted from an excitation light source, the hybrid fluorescent material preferably emit light of color corresponding to the CIE color coordinates of x value in a range of 0.405 to 0.465 and y value in a range of 0.515 to 0.545. When the x value and the y value of the hybrid fluorescent material confirm the range of the CIE color coordinates described above, a desired color of light can be obtained.

The hybrid fluorescent material according to the present disclosure can be used in a light emitting device that employs a hybrid fluorescent material as a constituent component of a wavelength converting member and an excitation light source. The excitation light source preferably emits light of 490 nm or less, and more preferably emits light with wavelength in a range of 380 nm to 485 nm. The light emitting device may include other components as needed.

A light emitting device employing the hybrid fluorescent material may include one or more other fluorescent materials. Upon excitation by light of 490 nm or less emitted from an excitation source, the hybrid fluorescent material according to the present disclosure can emit fluorescent light of green to yellow-green color. Upon being excited by light of 490 nm or less emitted from an excitation source, the one or more other fluorescent materials preferably emit fluorescent light of yellow-red to red color. Examples of the one or more other fluorescent materials include those represented by the formulae (I) to (III) shown below:

$$(Ca_{1-p-q}Sr_pEu_q)AlSiN_3 \tag{I}$$

where p and q satisfy $0 \leq p \leq 1.0$, $0 \leq q < 1.0$, and $p+q < 1.0$;

$$(Ca_{1-r-s-t}Sr_rBa_sEu_t)_2Si_5N_8 \tag{II}$$

where r, s, and t satisfy $0 \leq r \leq 1.0$, $0 \leq s \leq 1.0$, $0 < t < 1.0$, and $r+s+t \leq 1.0$;

$$A_2[M_{1-u}Mn^{4+}{}_uF_6] \tag{III}$$

where A is at least one cation selected from the group consisting of $K^+$, $Li^+$, $Na^+$, $Rb^+$, $Cs^+$ and $NH^{4+}$, M is at least one element selected from the group consisting of Group 4 elements and Group 14 elements, and u satisfies $0 < u < 0.2$.

The light emitting device may be arranged in generally known configurations. Examples of the type of the light emitting device include a lamp-type and a surface-mounted type. Further, the light emitting device may be used for illuminations and back-lights that can emit white light.

EXAMPLES

Next, the present disclosure will be more specifically described with reference to examples. However, it shall be understood that none of the examples limit the present disclosure.

Production Example 1

(A) Providing $Lu_3Al_5O_{12}$:Ce Fluorescent Material Particles

Lutetium oxide ($Lu_2O_3$), cerium oxide (CeO), aluminum oxide ($Al_2O_3$) were weighed to obtain a composition ratio of Lu:Ce:Al=2.935:0.065:5, and obtained a raw material mixture. Barium fluoride was added as a flux and the raw material mixture and the flux were mixed by using a ball mill. The powder obtained by drying is placed in an alumina crucible and calcined under a reducing atmosphere at 1,500° C. for 10 hours, giving a calcined product. The obtained calcined product was dispersed in water, and wet-sieving is performed by applying a continuous flow of a solvent while applying various kinds of vibrations, then, dehydration, drying, and dry-sieving are performed to obtain $Lu_{2.935}Ce_{0.065}Al_5O_{12}$ fluorescent material particles having an average particle diameter of 11 μm. In the present specification, the average particle diameter of LuAG:Ce fluorescent material is a volume-average particle diameter, obtained according to the evaluation method described further below.

Example 1

Step (A): $Lu_{2.935}Ce_{0.065}Al_5O_{12}$ fluorescent material particles produced in Production Example 1 was provided.

Step (B): In this step, 50 g of the $Lu_{2.935}Ce_{0.065}Al_5O_{12}$ fluorescent material particles provided in the step (A) was dispersed in 150 ml of an ammonium hydrogen carbonate aqueous solution that contains 17.5 mass % of ammonium hydrogen carbonate.

Step (C): In this step, 16.9 g of yttrium nitrate aqueous solution that contains 12.5 mass % of yttrium nitrate ($Y_2$ (NO$_3$)$_3$), 15.5 g of aluminum nitrate (Al(NO$_3$)$_3$.9H$_2$O), and 0.46 g of cerium chloride (CeCl$_3$.7H$_2$O) were dissolved in 50 ml of water to provide an aqueous solution.

Step (D): In this step, while stirring 150 ml of ammonium hydrogen carbonate aqueous solution obtained in the step (B) and containing Lu$_{2.935}$Ce$_{0.065}$Al$_5$O$_{12}$ fluorescent material particles, 50 ml of the aqueous solution obtain in the step (C) was added in drop for 5 minutes, giving a hybrid fluorescent material precursor of Lu$_{2.935}$Ce$_{0.065}$Al$_5$O$_{12}$ fluorescent material particles having YAG:Ce fluorescent material precursor attached on the surfaces thereof.

Step (E): The hybrid fluorescent material precursor was precipitated, then filtered and dried, then dry-sieved to separate desired sizes of the particles.

Step (F): To 100 pts. mass of the hybrid fluorescent material precursor that was dry-sieved in the step (E), 0.16 pts. mass (0.08 g) of ammonium fluoride (NH$_4$F) was mixed as a flux and the mixture was charged in an alumina crucible and then calcined under a reducing atmosphere at 1,500° C. for 10 hours, giving a hybrid fluorescent material.

Step (G): The hybrid fluorescent material was wet-dispersed using alumina balls as media, and wet-sieved, then dehydrated and dried, and dry-sieved to obtain the desired particle sizes. Thus, the hybrid fluorescent material of Lu$_{2.935}$Ce$_{0.065}$Al$_5$O$_{12}$ fluorescent material particles whose surfaces are covered by Y$_{2.850}$Ce$_{0.105}$Al$_5$O$_{12}$ fluorescent material, shown in Table 1, having an average particle diameter of 13 µm was obtained. In the hybrid fluorescent material, the content of Y$_{2.850}$Ce$_{0.150}$Al$_5$O$_{12}$ fluorescent material was 5 mass %.

Example 2

The hybrid fluorescent material of Lu$_{2.935}$Ce$_{0.065}$Al$_5$O$_{12}$ fluorescent material particles whose surfaces are covered by Y$_{2.800}$Ce$_{0.200}$Al$_5$O$_{12}$ fluorescent material, shown in Table 1, having an average particle diameter of 13 µm was obtained in a similar manner as in Example 1, except that in the step (C), used was an aqueous solution, in which 16.5 g of Y$_2$(NO$_3$)$_3$ aqueous solution, 15.5 g of Al(NO$_3$)$_3$.9H$_2$O and 0.62 g of cerium chloride CeCl$_3$.7H$_2$O were dissolved. In the hybrid fluorescent material, the content of Y$_{2.800}$Ce$_{0.200}$Al$_5$O$_{12}$ fluorescent material was 5 mass %.

Example 3

The hybrid fluorescent material of Lu$_{2.935}$Ce$_{0.065}$Al$_5$O$_{12}$ fluorescent material particles whose surfaces are covered by Y$_{2.750}$Ce$_{0.250}$Al$_5$O$_{12}$ fluorescent material, shown in Table 1, having an average particle diameter of 13 µm was obtained in a similar manner as in Example 1, except that in the step (C), used was an aqueous solution, in which 16.1 g of Y$_2$(NO$_3$)$_3$ aqueous solution, 15.5 g of Al(NO$_3$)$_3$.9H$_2$O and 0.77 g of CeCl$_3$.7H$_2$O were dissolved. In the hybrid fluorescent material, the content of Y$_{2.750}$Ce$_{0.250}$Al$_5$O$_{12}$ fluorescent material was 5 mass %.

Example 4

The hybrid fluorescent material of Lu$_{2.935}$Ce$_{0.065}$Al$_5$O$_{12}$ fluorescent material particles whose surfaces are covered by Y$_{2.000}$Ce$_{0.100}$Al$_5$O$_{12}$ fluorescent material, shown in Table 1, having an average particle diameter of 13 µm was obtained in a similar manner as in Example 1, except that in the step (C), used was an aqueous solution, in which 9.1 g of Y$_2$(NO$_3$)$_3$ aqueous solution, 14.5 g of Al(NO$_3$)$_3$.9H$_2$O and 2.9 g of CeCl$_3$.7H$_2$O were dissolved. The content of Y$_{2.000}$Ce$_{0.100}$Al$_5$O$_{12}$ fluorescent material was 5 mass %.

Comparative Example 1

Yttrium oxide (Y$_2$O$_3$), CeO, Al$_2$O$_3$, Ga$_2$O$_3$ were weighed to obtain a composition ratio of Y:Ce:Al:Ga=2.945:0.055:4:1, and obtained a raw material mixture. Boric acid (H$_3$BO$_3$) and barium fluoride (BaF$_2$) were added as flux and the raw material mixture and the flux were mixed by using a ball mill. The mixture was placed in an alumina crucible and then calcined under an air atmosphere at 1,500° C. for 10 hours, giving a calcined product. The obtained calcined product was dispersed in water, and wet-sieved, then, dehydration, drying, and dry-sieving were performed, and Y$_{2.945}$Ce$_{0.055}$Al$_4$GaO$_{12}$ fluorescent material particles, shown in Table 1, having an average particle diameter of 12 µm was obtained.

Comparative Example 2

Lu$_2$O$_3$, CeO, and Al$_2$O$_3$ were weighed to obtain a composition ratio of Lu:Ce:Al=2.935:0.065:5, and obtained a raw material mixture. As a flux, BaF$_2$ was added to 100 pts. mass of the raw material mixture, and the raw material mixture and the flux were mixed by using a ball mill. The mixture was placed in an alumina crucible and then calcined under a reducing atmosphere at 1,500° C. for 10 hours, giving a calcined product. The obtained calcined product was dispersed in water, and wet-sieved, then, dehydration, drying, and dry-sieving were performed, and Lu$_{2.935}$Ce$_{0.065}$Al$_5$O$_{12}$ fluorescent material particles, shown in Table 1, having an average particle diameter of 12 µm was obtained. Subsequently, Y$_2$O$_3$, CeO, Al$_2$O$_3$ were weighed to obtain a composition ratio of Y:Ce:Al=2.890:0.110:5, and obtained a raw material mixture. H$_3$BO$_3$ and BaF$_2$ were added as flux and the raw material mixture and the flux were mixed by using a ball mill. The powder obtained by drying is placed in an alumina crucible and then calcined under a reducing atmosphere at 1,500° C. for 10 hours, giving a calcined product. The obtained calcined product was wet-sieved, then, dehydration, drying, and dry-sieving were performed and Y$_{2.890}$Ce$_{0.110}$Al$_5$O$_{12}$ fluorescent material particles, shown in Table 1, having an average particle diameter of 13 µm was obtained. The obtained Y$_{2.890}$Ce$_{0.110}$Al$_5$O$_{12}$ fluorescent material particles and Lu$_{2.935}$Ce$_{0.065}$Al$_5$O$_{12}$ were mixed at a mass ratio of 1:5 (YAG:LuAG), and adjusted to desired color of light to be emitted, and employed as a fluorescent material of Comparative Example 2.

Evaluation

Average Particle Diameter

The volume-average particle diameter (median diameter) of each of the fluorescent materials of the examples and the comparative examples were measured by using the laser diffraction-type particle-size distribution measuring device (the MASTER SIZER 3000, manufactured by Malvern Instruments Ltd.).

Composition Analysis

Composition analysis was performed for each fluorescent material of the examples and the comparative examples, by using an inductively coupled plasma emission spectrometer (ICP-AES, manufactured by Perkin-Elmer Corporation). The results are shown in Table 1.

Relative Emission Luminance

Relative emission luminance of each fluorescent material of the examples and the comparative examples was measured. The relative emission luminance is determined such that light of excitation wavelength of 460 nm from the excitation light source is reflected and using a fluorescence spectrometer (Manufacture: Hitachi High-Tech Science Corporation, Model number: F-4500), luminance of each fluorescent material at room temperature (i.e., 25° C.±5° C.) was measured and determined as a relative value to the luminance of the fluorescent material of Comparative Example 1. The results are shown in Table 2.

CIE Chromaticity Coordinates (x, y)

The x-value and the y-value of CIE chromaticity coordinates of each fluorescent material of the examples and the comparative examples were measured using an excitation light source having a emission peak wavelength of 460 nm and by a fluorescence spectrometer (Manufacturer: Hitachi High-Tech Science Corporation; Model number: F-4500). The results are shown in Table 2.

Relationship between Temperature and Luminance

The luminance of each fluorescent material of the examples and the comparative examples at temperatures of room temperature (i.e., 25° C.±5° C.), 50° C., 100° C., 200° C., and 300° C. were measured using an excitation light source having a emission peak wavelength of 460 nm and by a fluorescence spectrometer (Manufacturer: Hitachi High-Tech Science Corporation; Model number: F-4500). Using the value of luminance of each fluorescent material at room temperature as a base of 100, the luminance of each fluorescent material at each temperature is determined as a relative value (relative emission luminance) with respect to the luminance the luminance at the room temperature. Each fluorescent material was held for 5 minutes at each temperature. The results are shown in Table 3 and FIG. 4.

SEM Images

SEM images of hybrid fluorescent material precursor of Example 1 (FIGS. 1A and 1B), hybrid fluorescent material of Example 1 (FIGS. 2A and 2B), and cross sections of the hybrid fluorescent material of Example 1 (FIGS. 3A and 3B) were obtained by using a scanning electron microscope (SEM).

TABLE 1

|  | Fluorescent Material Particles | Fluorescent Material Covering Surfaces |
| --- | --- | --- |
| Comparative Example 1 | $Y_{2.945}Ce_{0.055}Al_4GaO_{12}$ | — |
| Comparative Example 2 | $Y_{2.890}Ce_{0.110}Al_5O_{12}$ and $Lu_{2.935}Ce_{0.065}Al_5O_{12}$ (Mixture of Powders) | — |
| Example 1 | $Lu_{2.935}Ce_{0.065}Al_5O_{12}$ | $Y_{2.850}Ce_{0.150}Al_5O_{12}$ |
| Example 2 | $Lu_{2.935}Ce_{0.065}Al_5O_{12}$ | $Y_{2.800}Ce_{0.200}Al_5O_{12}$ |
| Example 3 | $Lu_{2.935}Ce_{0.065}Al_5O_{12}$ | $Y_{2.750}Ce_{0.250}Al_5O_{12}$ |
| Example 4 | $Lu_{2.935}Ce_{0.065}Al_5O_{12}$ | $Y_{2.00}Ce_{0.100}Al_5O_{12}$ |

TABLE 2

|  | CIE Chromaticity Coordinates | | Relative Emission luminance |
| --- | --- | --- | --- |
|  | X | Y | Y (%) |
| Comparative Example 1 | 0.388 | 0.572 | 100 |
| Comparative Example 2 | 0.391 | 0.568 | 108 |
| Example 1 | 0.373 | 0.578 | 105 |
| Example 2 | 0.382 | 0.574 | 104 |
| Example 3 | 0.385 | 0.572 | 102 |
| Example 4 | 0.394 | 0.566 | 105 |

TABLE 3

| Temperature (° C.) at Measuring | | 25 | 50 | 100 | 200 | 300 |
| --- | --- | --- | --- | --- | --- | --- |
| Relative Emission luminance (%) | Comparative Example 1 | 100 | 99 | 97 | 89 | 64 |
| | Comparative Example 2 | 100 | 99 | 97 | 89 | 71 |
| | Example 1 | 100 | 102 | 101 | 94 | 80 |
| | Example 2 | 100 | 102 | 100 | 94 | 78 |
| | Example 3 | 100 | 105 | 102 | 95 | 78 |
| | Example 4 | 100 | 100 | 98 | 91 | 76 |

Figure 1B:
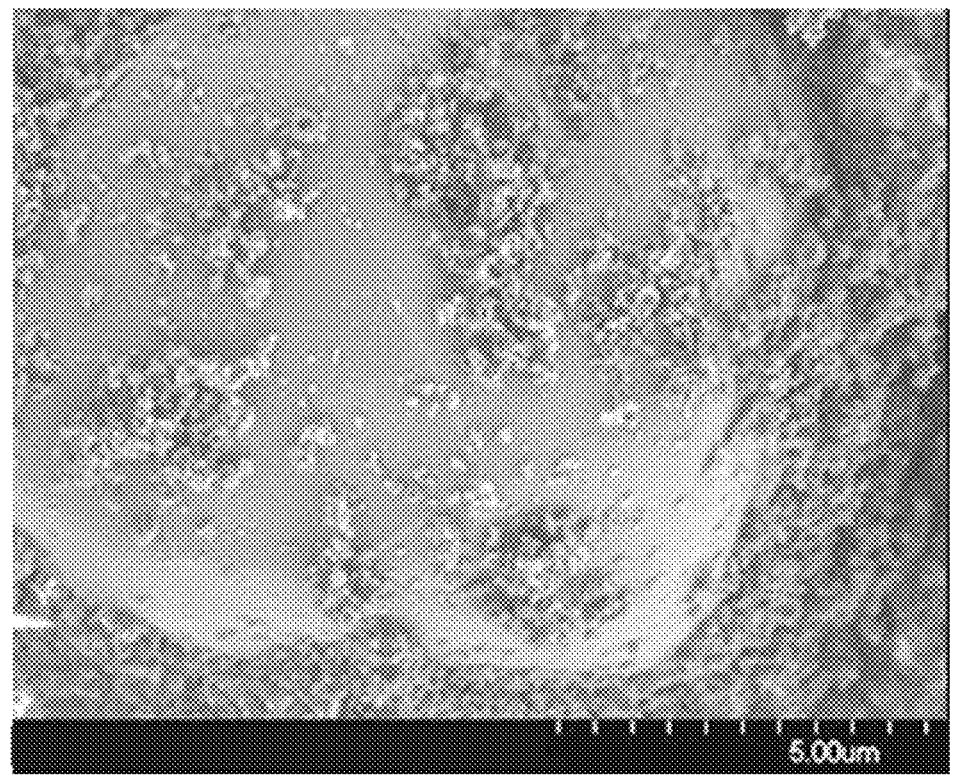
FIG. 1B is an SEM image further magnifying a part in FIG. 1A, respectively according to Example 1.
Figure 2A:
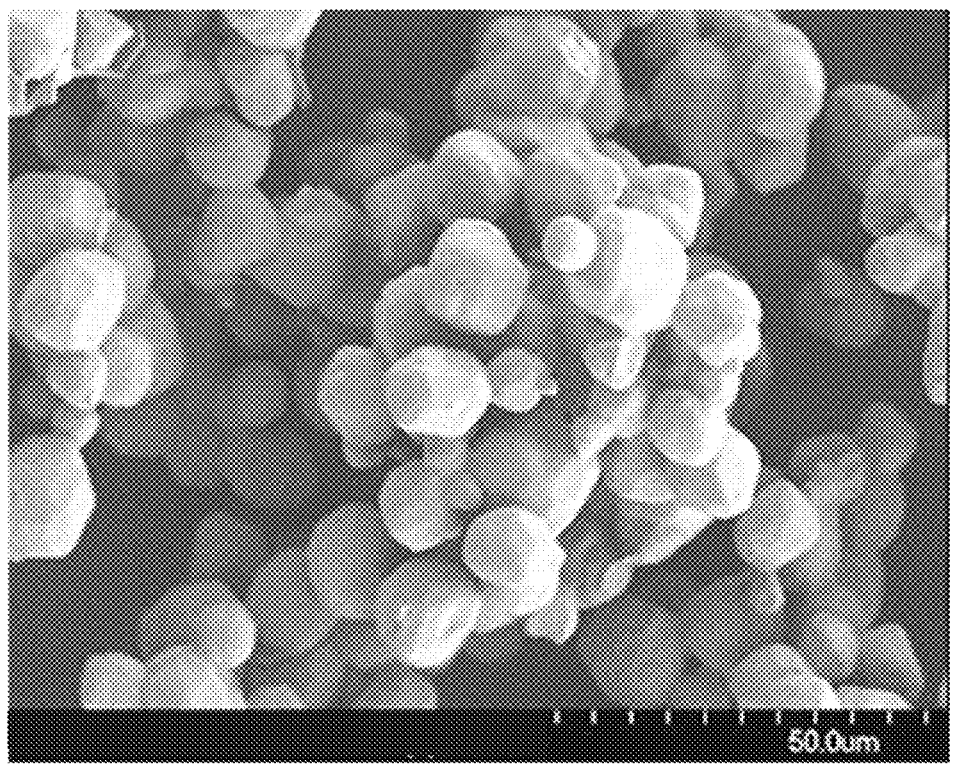
FIG. 2A is an SEM image showing hybrid fluorescent material particles obtained by calcining the fluorescent material precursor particles shown in FIG. 1A.
Figure 2B:
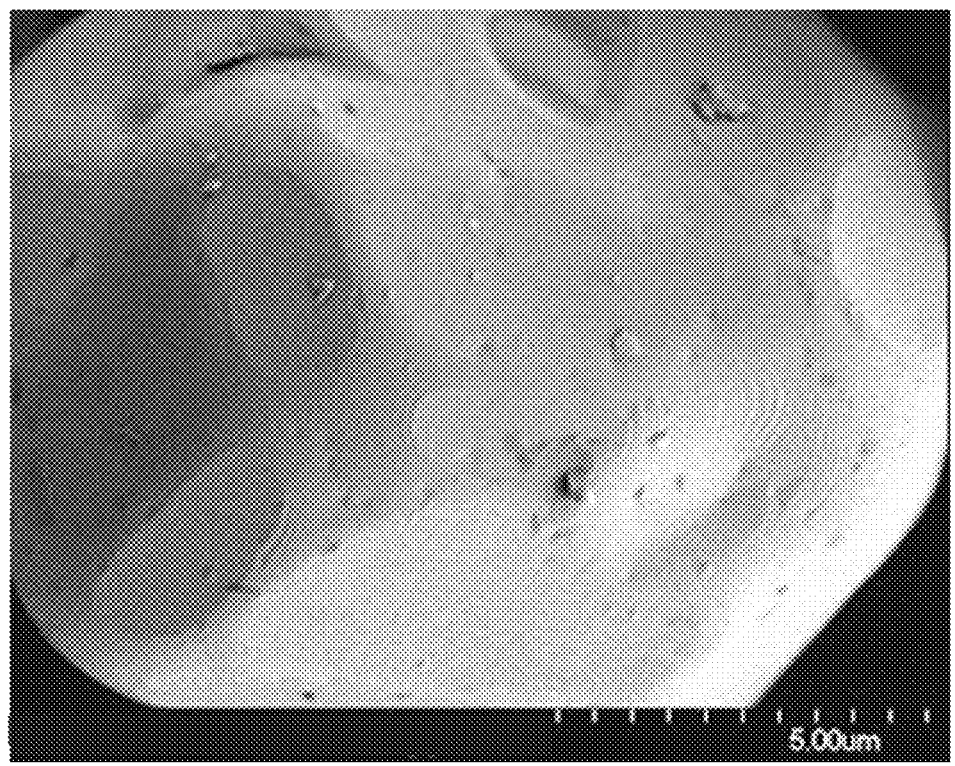
FIG. 2B is an SEM image further magnifying a part in FIG. 2A, respectively according to Example 1.
Figure 3A:
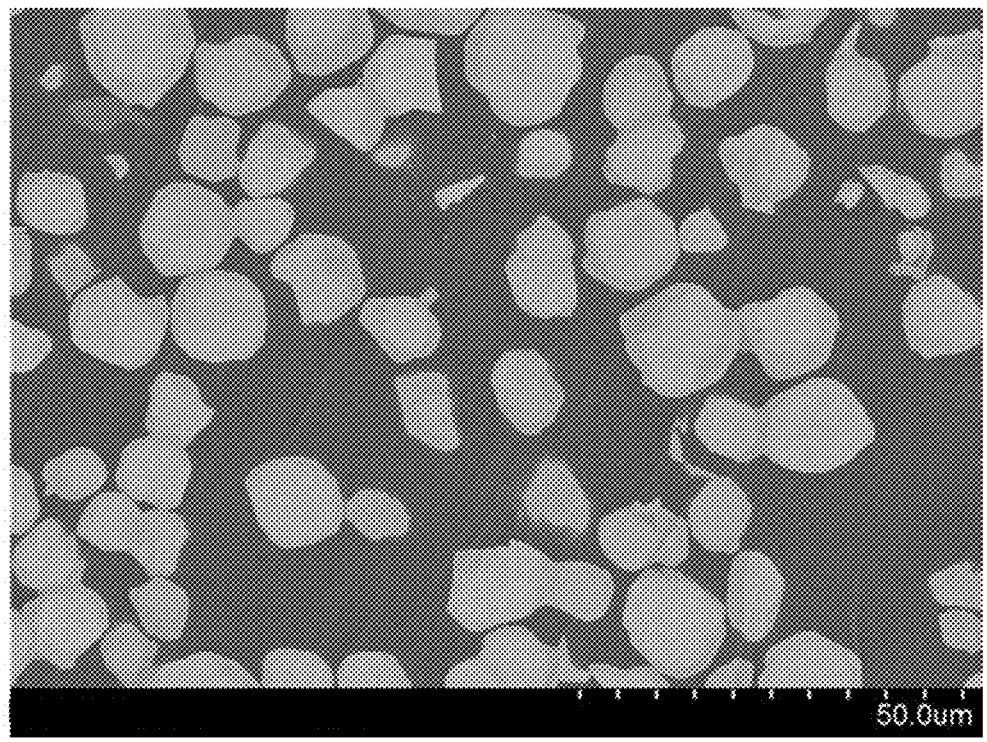
FIG. 3A is an SEM image showing cross-sections of the hybrid fluorescent material particles and FIG. 3B is an SEM image further magnifying a part in FIG. 3A.
Figure 3B:
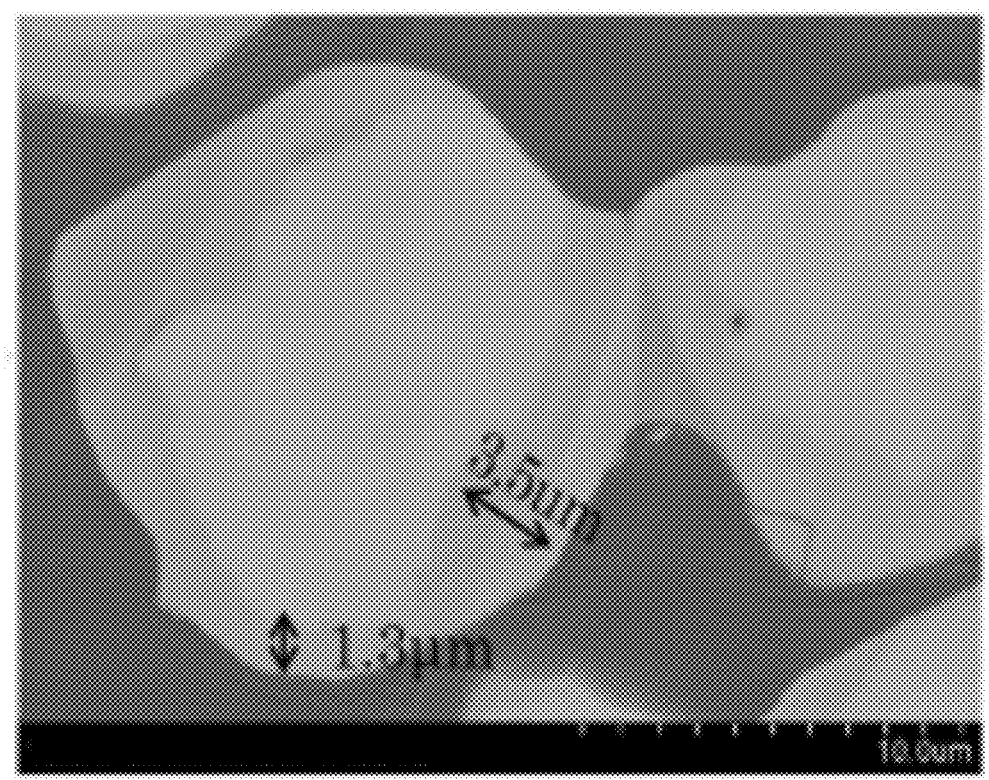

As shown in FIGS. 1A and 1B, the hybrid fluorescent material precursor of after the step (D) has a particulate form of YAG:Ce-based fluorescent material precursor deposited by crystallization and attached on the surfaces of the LuAG:Ce fluorescent material particles. As shown in FIGS. 2A and 2B, after the step of (F), in the hybrid fluorescent material obtained by the calcining, YAG:Ce-based fluorescent material was made covering substantially whole surfaces of the LuAG:Ce fluorescent material particles. As shown in FIGS. 3A and 3B of the SEM images of cross-sections of the hybrid fluorescent material particles of Example 1, YAG:Ce-based fluorescent material was made covering substantially whole surfaces of the LuAG:Ce fluorescent material particles. The YAG:Ce-based fluorescent material covering the LuAG:Ce fluorescent material particles has some portions with a thickness of about 3.5 nm (about 32% of the average particle diameter of the LuAG:Ce fluorescent material particles) and some different portions with a thickness of about 1.3 μm (about 14% of the average particle diameter of the LuAG:Ce fluorescent material particles).

As shown in Table 2, the hybrid fluorescent materials of Examples 1 to 4 exhibited similar colors of light to that of the YAG:Ce-based fluorescent material of Comparative Example 1, and also exhibited good relative luminance, respectively.

Figure 4:
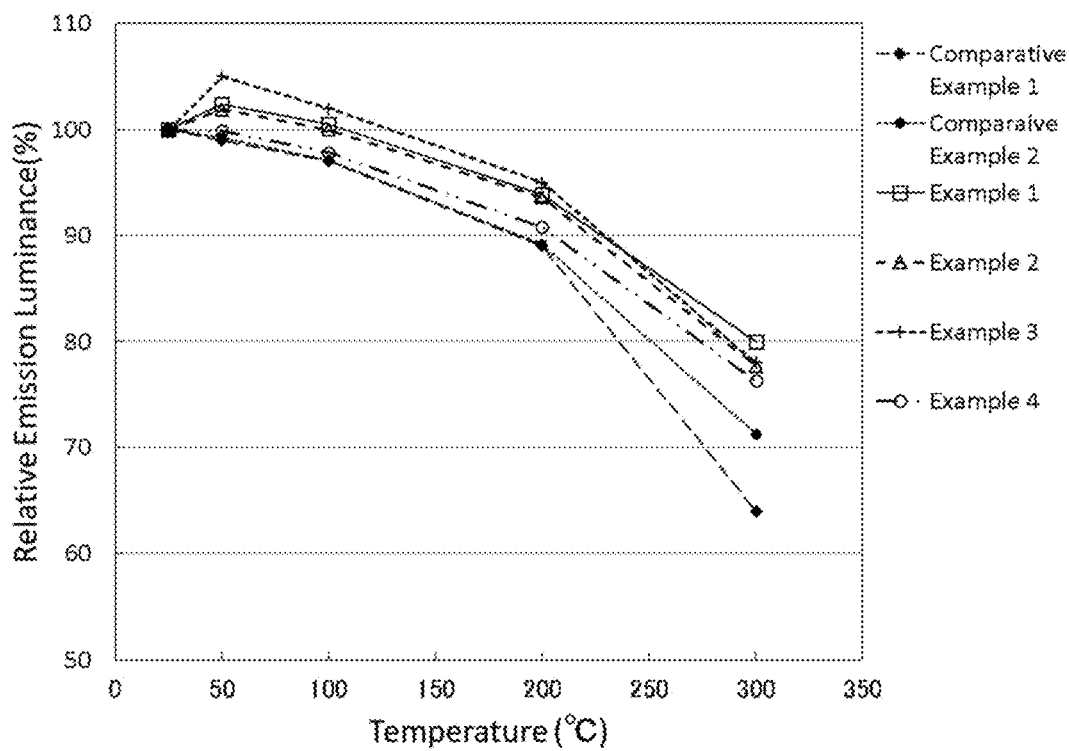
FIG. 4 shows graphs of relationships between the relative emission luminance (%) and the temperature of the fluorescent materials according to Examples 1 to 4 and Comparative Examples 1, 2.

As shown in Table 3 and FIG. 4, the hybrid fluorescent materials of Examples 1 to 4 exhibited lower decrease in the luminance due to a rise in the temperature even at a high temperature range of 100° C. to 300° C. compared to that of the fluorescent materials of Comparative Examples 1 and 2, thus confirming good thermal characteristics.

The present disclosure provide a hybrid fluorescent material which can emit and maintain a desired color of light, and which has improved temperature characteristics, along with a method for producing the same. The hybrid fluorescent materials according to the present disclosure have improved thermal characteristics, allowing the use in the light emitting elements that employ nitride-based compound semiconductors of high-efficiency and high output, thus allowing the suitable use in the light emitting devices for light sources of lightings, light sources of backlights, LED displays, and the like, and thus industrially advantageous.

Although the present disclosure has been described with reference to several exemplary embodiments, it shall be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

What is claimed is:

1. A method of producing a hybrid fluorescent material comprising:
   (A) providing fluorescent material particles by heat treatment of a raw material mixture containing oxides or compounds convertible to the oxides by the heat treatment that contain lutetium (Lu), aluminum (Al), and cerium (Ce), wherein the composition ratio of the total of lutetium (Lu) and cerium (Ce) to aluminum (Al) in the raw material mixture is adjusted to 3:5, wherein a temperature of the heat treatment is in a range of 1000° C. to 2100° C.;
   (B) dispersing the fluorescent material particles obtained in (A) in a solution containing carbonate, wherein the carbonate is at least one carbonate selected from the group consisting of sodium carbonate, potassium carbonate, sodium hydrogen carbonate, ammonium hydrogen carbonate, and ammonium carbonate;
   (C) providing a solution containing a mixture of a first metallic salt containing at least one element selected from the group consisting of yttrium, gadolinium, and terbium, a second metallic salt containing aluminum or gallium, and a third metallic salt containing cerium, wherein the composition ratio of the total of yttrium (Y), gadolinium (Gd), and terbium (Tb) to the total of aluminum (Al) and gallium (Ga) in the solution is adjusted to 3:5;
   (D) mixing the solution obtained in (C) in the solution having the fluorescent material particles dispersed therein obtained in (B), to attach a fluorescent material precursor on surfaces of the fluorescent material particles obtained in (A), in order to obtain a hybrid fluorescent material precursor;
   (E) separating the hybrid fluorescent material precursor from the solution; and
   (F) calcining the hybrid fluorescent material precursor to obtain the hybrid fluorescent material in which the fluorescent material particles obtained in (A) are covered by a fluorescent material derived from the fluorescent material precursor attached to the surfaces on the fluorescent material particles in (D).

2. The method of producing a hybrid fluorescent material according to claim 1, wherein in (C) a solution containing a mixture of a first metallic salt containing yttrium or gadolinium, a second metallic salt containing aluminum or gallium, and a third metallic salt containing cerium, is provided.

3. The method of producing a hybrid fluorescent material according to claim 1, wherein in (C), a solution containing a mixture of a first metallic salt containing terbium, a second metallic salt containing aluminum, and a third metallic salt containing cerium is provided.

4. The method of producing a hybrid fluorescent material according to claim 1, wherein in (C), the first metallic salt, the second metallic salt, and the third metallic salt are salts of at least one selected from the group consisting of a nitrate, a sulphate, and a chloride.

5. The method of producing a hybrid fluorescent material according to claim 1, wherein in (F), the calcining is performed in a reducing atmosphere.

6. The method of producing a hybrid fluorescent material according to claim 1, wherein in (B), the carbonate is at least one carbonate selected from the group consisting of ammonium hydrogen carbonate and ammonium carbonate.

7. The method of producing a hybrid fluorescent material according to claim 1, wherein (F) further comprises mixing a hybrid fluorescent material precursor and a flux.

8. The method of producing a hybrid fluorescent material according to claim 7, wherein the flux is a fluorine compound.

9. The method of producing a hybrid fluorescent material according to claim 1, wherein in (F), the calcining is carried out at a temperature in a range of 1,400° C. to 1,600° C.

10. The method of producing a hybrid fluorescent material according to claim 1, wherein in (A), an average particle diameter of the fluorescent material particles is in a range of 5 μm to 25 μm.

* * * * *